US008280577B2

(12) United States Patent
Hashimoto et al.

(10) Patent No.: US 8,280,577 B2
(45) Date of Patent: Oct. 2, 2012

(54) DRIVING RECORDER

(75) Inventors: Akihiro Hashimoto, Otsu (JP); Hiroji Kohsaka, Kusatsu (JP); Keiko Kohsaka, legal representative, Kusatsu (JP); Masatomo Ishikura, Kyoto (JP)

(73) Assignee: Horiba, Ltd., Kyoto (JP)

( * ) Notice: Subject to any disclaimer, the term of this patent is extended or adjusted under 35 U.S.C. 154(b) by 619 days.

(21) Appl. No.: 11/993,834

(22) PCT Filed: Jun. 23, 2006

(86) PCT No.: PCT/JP2006/312585

§ 371 (c)(1),
(2), (4) Date: Feb. 5, 2010

(87) PCT Pub. No.: WO2007/000941

PCT Pub. Date: Jan. 4, 2007

(65) Prior Publication Data

US 2010/0152964 A1 Jun. 17, 2010

(30) Foreign Application Priority Data

Jun. 25, 2005 (JP) ................................ 2005-213409

(51) Int. Cl.
*G01M 17/00* (2006.01)
*G06F 19/00* (2011.01)

(52) U.S. Cl. ..................................... 701/32.2; 701/33.3

(58) Field of Classification Search ........................ None
See application file for complete search history.

(56) References Cited

U.S. PATENT DOCUMENTS

| | | | |
|---|---|---|---|
| 5,948,026 | A | 9/1999 | Beemer et al. |
| 5,964,813 | A | 10/1999 | Ishii et al. |
| 6,088,635 | A | 7/2000 | Cox et al. |
| 6,108,598 | A | 8/2000 | Sumitani |
| 6,141,611 | A | 10/2000 | Mackey et al. |
| 6,151,541 | A | 11/2000 | Iizuka |
| 6,163,338 | A | 12/2000 | Johnson et al. |
| 6,185,490 | B1 | 2/2001 | Ferguson |
| 6,246,933 | B1 | 6/2001 | Bague |
| 6,246,934 | B1 | 6/2001 | Otake et al. |
| 6,266,588 | B1 | 7/2001 | McClellan et al. |

(Continued)

FOREIGN PATENT DOCUMENTS

CN 1834008 12/2002

(Continued)

OTHER PUBLICATIONS

Japanese Application No. 2005-194461 Notice of Allowance dated Aug. 7, 2012, 3 pages.

*Primary Examiner* — Fahd Obeid

(57) ABSTRACT

In order to provide an integrated driving recorder that can avoid a trouble due to a temperature rise in a vehicle interior, the driving recorder 1 is so arranged that one or multiple detection devices that sense a situation concerning a behavior, a surrounding conditions of a vehicle, or the like and that output situation data indicating the situation, and a situation data storage section that stores the situation data output from the detection device are held in a single casing 2, and a heat dissipation area **2*a* is formed on the casing 2 and a heat conduction member 9 that has a predetermined thermal conductivity and whose one surface is connected to the heat dissipation area 2*a* is arranged and another surface of the heat conduction member 9** can be bonded to a window glass W of the vehicle.

7 Claims, 7 Drawing Sheets

U.S. PATENT DOCUMENTS

| | | | |
|---|---|---|---|
| 6,324,450 | B1 | 11/2001 | Iwama |
| 6,356,824 | B1 | 3/2002 | Chene et al. |
| 6,438,472 | B1 | 8/2002 | Tano et al. |
| 7,203,581 | B2 | 4/2007 | Okada |
| 7,391,305 | B2 | 6/2008 | Knoll et al. |
| 7,965,312 | B2 | 6/2011 | Chung et al. |
| 2002/0035422 | A1 | 3/2002 | Sasaki |
| 2002/0177931 | A1 | 11/2002 | Iwasaki et al. |
| 2003/0033062 | A1 | 2/2003 | Nishina |
| 2003/0154009 | A1 | 8/2003 | Basir et al. |
| 2004/0113763 | A1 | 6/2004 | Bendavid et al. |
| 2004/0267419 | A1* | 12/2004 | Jeng ................................ 701/36 |
| 2005/0131597 | A1 | 6/2005 | Raz et al. |
| 2006/0184295 | A1 | 8/2006 | Hawkins et al. |
| 2008/0161995 | A1 | 7/2008 | Nakajima et al. |
| 2010/0318258 | A1 | 12/2010 | Katayamal |
| 2011/0066317 | A1 | 3/2011 | Lee |

FOREIGN PATENT DOCUMENTS

| | | |
|---|---|---|
| CN | 1502093 | 6/2004 |
| EP | 1 059 508 | 12/2000 |
| JP | 60-29753 | 2/1985 |
| JP | 63-265383 | 11/1988 |
| JP | 1-39245 | 11/1989 |
| JP | 05-197858 | 8/1993 |
| JP | 06-044430 | 2/1994 |
| JP | 08-169284 | 7/1996 |
| JP | 09-050547 | 2/1997 |
| JP | 09-231422 | 9/1997 |
| JP | 11-183182 | 9/1999 |
| JP | 2000-043764 | 2/2000 |
| JP | 2004-240828 | 2/2000 |
| JP | 2000-092420 | 3/2000 |
| JP | 2000-194895 | 7/2000 |
| JP | 2000-309287 | 11/2000 |
| JP | 2001-124585 | 5/2001 |
| JP | 2003-069936 | 3/2003 |
| JP | 2003-168882 | 6/2003 |
| JP | 2003-252256 | 9/2003 |
| JP | 2004-064634 | 2/2004 |
| JP | 2004-075033 | 3/2004 |
| JP | 2004-318912 | 11/2004 |
| JP | 2004-345599 | 12/2004 |
| JP | 2005-500931 | 1/2005 |
| JP | 1 548 653 | 6/2005 |

* cited by examiner

DRIVING RECORDER

FIELD OF THE ART

This invention relates to a driving recorder that records behavior or a surrounding situation of a vehicle during a certain period before and after a time of an accident or a hiyari-hatto, in other words, a case when a driver feels chill because he or she is close to be involved in an accident even though this situation does not reach an accident in case an accident occurs or a driver feels chill because of the above reason, and that can preferably makes an after-the-fact analysis why the vehicle gets involved in the situation.

BACKGROUND ART

Nowadays, car accidents have become a social problem and investigation for the accidents is absolutely imperative, for example, in order to avoid an accident by means of prior prediction or in order to enable an early settlement of a compensation problem of an accident. As a result of this, a vehicle-mounted driving recorder has been developed that can automatically record an image of outside or inside of a motor vehicle (an automobile) during driving and that can be utilized as an accident coping system such that it can be used as an evidence in case of an accident.

Conventionally this kind of driving recorder comprises an imaging unit and a body to process and store its image, each of which is separately formed, however, recently this kind of driving recorder is downsized by integrally forming an imaging unit and a body due to downsizing of an image receiving element as shown in the patent document 1.

This kind of driving recorder may be installed at any place as far as it can see a front of the vehicle, and the place may be any as far as the inside of the vehicle, for example, a roof part, a windshield and an upper surface of a dashboard.

However, a conventional driving recorder does not deeply take into consideration that the inside of the vehicle is in a severe environment in respect of the temperature. Then the driving recorder wherein the imaging unit and the body are integrally formed might cause malfunction due to high temperature considering electric power consumption of the driving recorder itself in case the driving recorder is left in the vehicle with the window closed under the boiling sun during summer.

Patent document 1: Japan patent laid open number 2004-345599

DISCLOSURE OF THE INVENTION

Problems to be Solved by the Invention

Then the present claimed invention focuses attention on that a window glass of a vehicle is difficult to be high in temperature under the boiling sun and intends to avoid a problem due to temperature raise by tightly attaching the casing to a window glass through a heat conduction member with making use of the window glass as a heat dissipation member.

Means to Solve the Problems

More specifically, the driving recorder in accordance with this invention is so arranged that one or multiple detection devices that sense a situation concerning a behavior, a surrounding conditions of a vehicle, or the like and that output situation data indicating the situation, and a situation data storage section that stores the situation data output from the detection device are held in a single casing, and is characterized by that a heat dissipation area is formed on the casing and a heat conduction member that has a predetermined thermal conductivity and whose one surface is connected to the heat dissipation area is arranged and another surface of the heat conduction member can be bonded to a window glass of the vehicle.

In accordance with this arrangement, since the casing can be thermally connected to the window glass that is difficult to be high in temperature even though receiving the direct sunlight, the heat can be dissipated through the window glass by making use of the window glass as a heat dissipation member, thereby preventing the driving recorder from malfunction due to the high temperature.

In order to dissipate the heat effectively, it is preferable that the heat dissipation area is made of metal.

In order to prevent excessive temperature rise by further improving the heat dissipation effect and to make it possible to preferably attach the driving recorder to the window glass by weight saving, it is preferable that almost all of the casing is made of metal and the metal is a magnesium alloy.

In order to make it possible to fittingly attach the driving recorder to a window glass even though the window glass is curved like an automobile windshield, it is preferable that the heat dissipation area is of a generally elliptical annular shape or a toric shape having a predetermined width, and the heat conduction member having a predetermined thickness and elasticity is arranged along the heat dissipation area. Furthermore, since the heat dissipation area and the heat conduction member are annular, it is possible to effectively utilize the space by arranging an image receiving face of the image receiving device in a center area surrounded by the annular heat dissipation area and the annular heat conduction member, thereby to further contribute to downsizing or weight saving of the whole driving recorder.

As a concrete embodiment of the driving recorder in consideration of appearance, represented is that a whole shape of the driving recorder is of a generally egg-shaped form and an outer circumferential edge part of a generally elliptical flat surface part formed by cutting a part of the egg-shaped form with a flat surface is set as the heat dissipation area.

In addition, as the detection device represented is that at least using an image receiving device, an acceleration sensor and a position sensor, and it is preferable that an image receiving surface of the image receiving device faces an opening of the generally elliptical flat surface part.

Effect of the Invention

In accordance with this invention, since the casing can be thermally connected to the windshield that is difficult to be high in temperature even though receiving the direct sunlight, the heat can be dissipated through a member of the windshield by making use of the windshield as the heat dissipation member, thereby preventing the driving recorder from malfunction due to the high temperature.

EXPLANATION OF THE REFERENCE NUMERAL

1 . . . driving recorder, 2 . . . casing, 2*a* . . . heat dissipation area, 3 . . . detection device, 82, 7 . . . situation data storage section (internal memory, detachable memory card), 9 . . . heat conduction member

BEST MODES OF EMBODYING THE INVENTION

An embodiment of the present claimed invention will be described with reference to FIG. 1 through FIG. 7.

Figure 1:
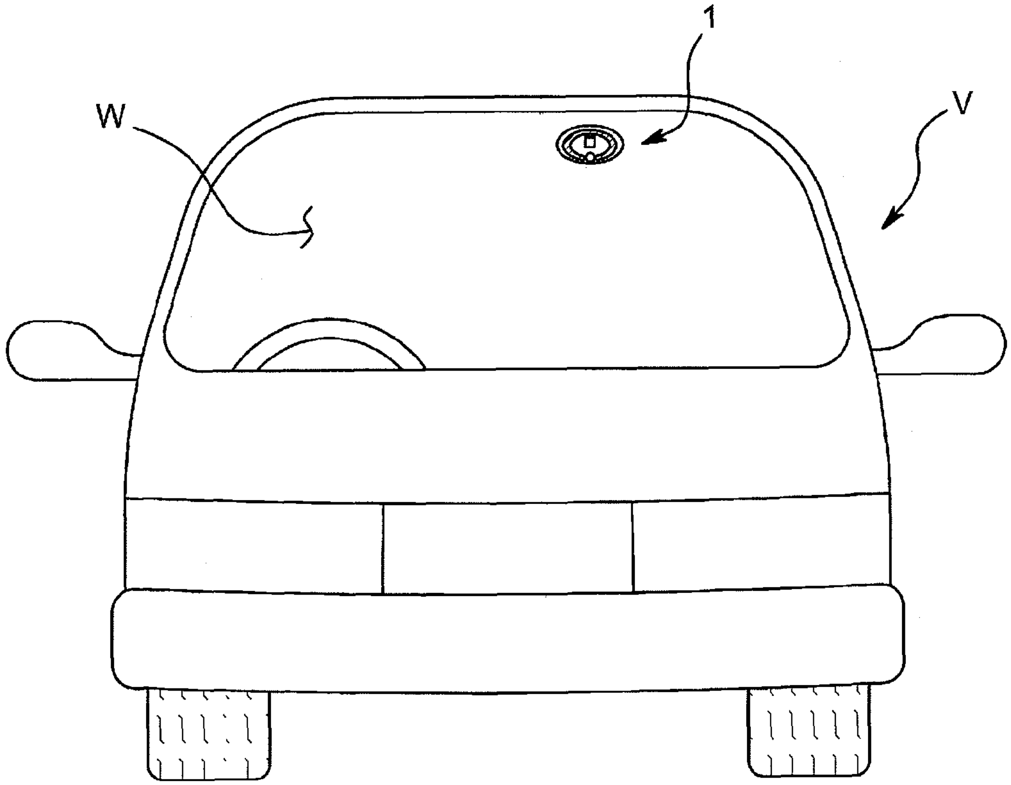
FIG. 1 is a pattern front view showing a case that a driving recorder in accordance with an embodiment of the invention is mounted on a vehicle.
Figure 2:
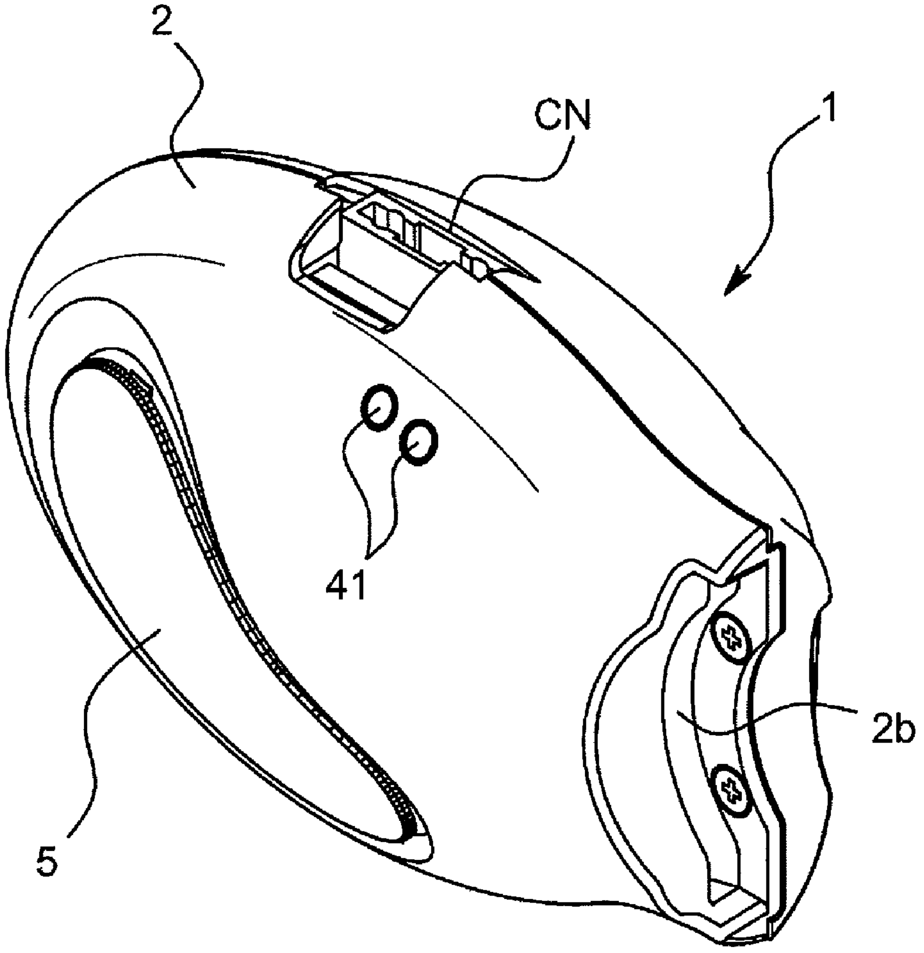
FIG. 2 is a perspective view of the driving recorder in accordance with this embodiment viewed from the inside of the vehicle.
Figure 3:
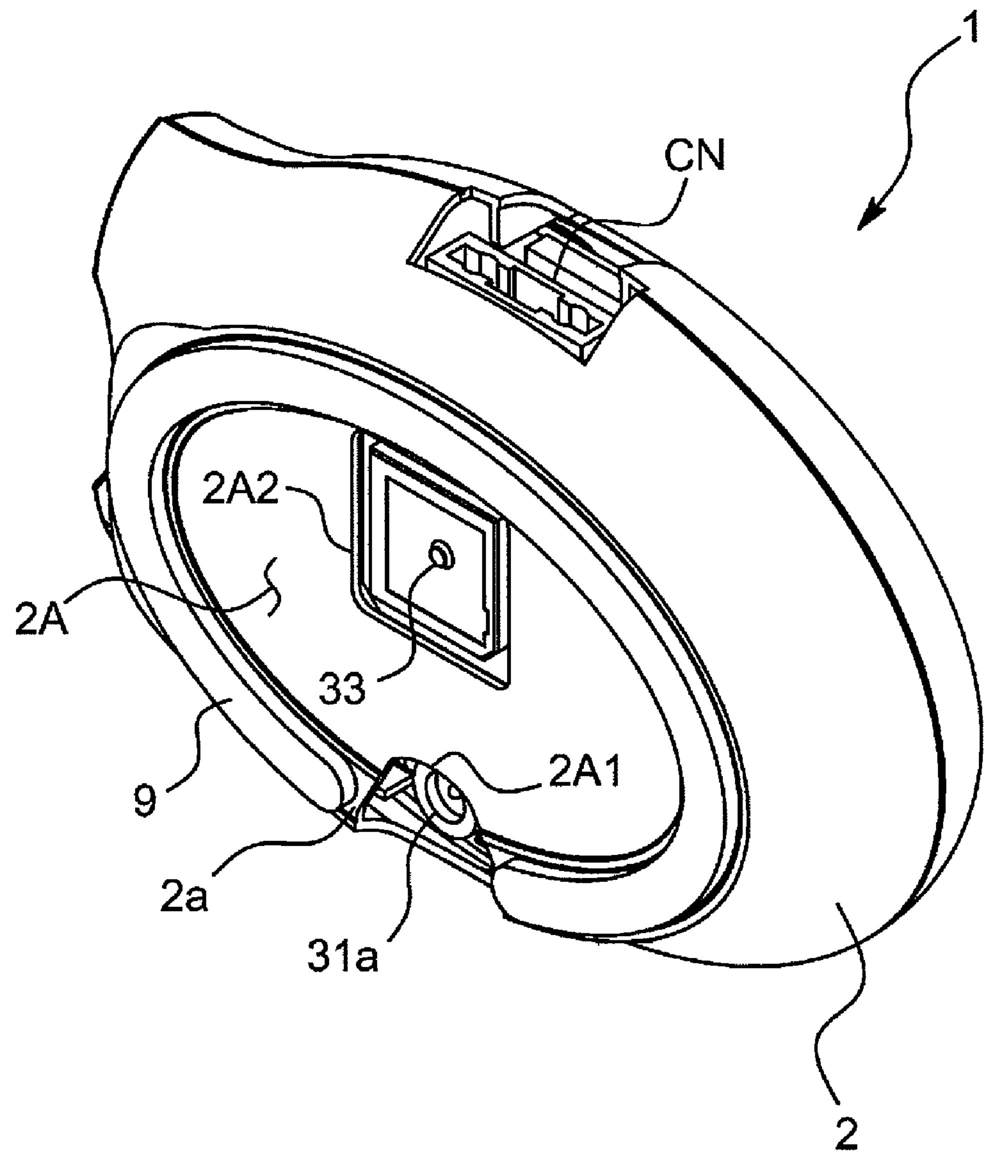
FIG. 3 is a perspective view of the driving recorder in accordance with this embodiment viewed from the outside of the vehicle.

A driving recorder 1 in accordance with this embodiment is of a vehicle-mounted type as shown in FIG. 1 or the like, to record behavior or a surrounding situation of a vehicle V during a certain period before and after a time of an accident or a hiyari-hatto, in other words, a time when a driver feels chill because he or she is close to be involved in an accident, and basic configuration elements, more specifically, a detection device 3, an information processing device 8, an alert device 4, an input device 5, a communication device 6 and a detachable recording device 7 are accommodated in a single casing 2 whose overall shape is of a generally egg-shaped form so as to be an integral unit.

Figure 7:
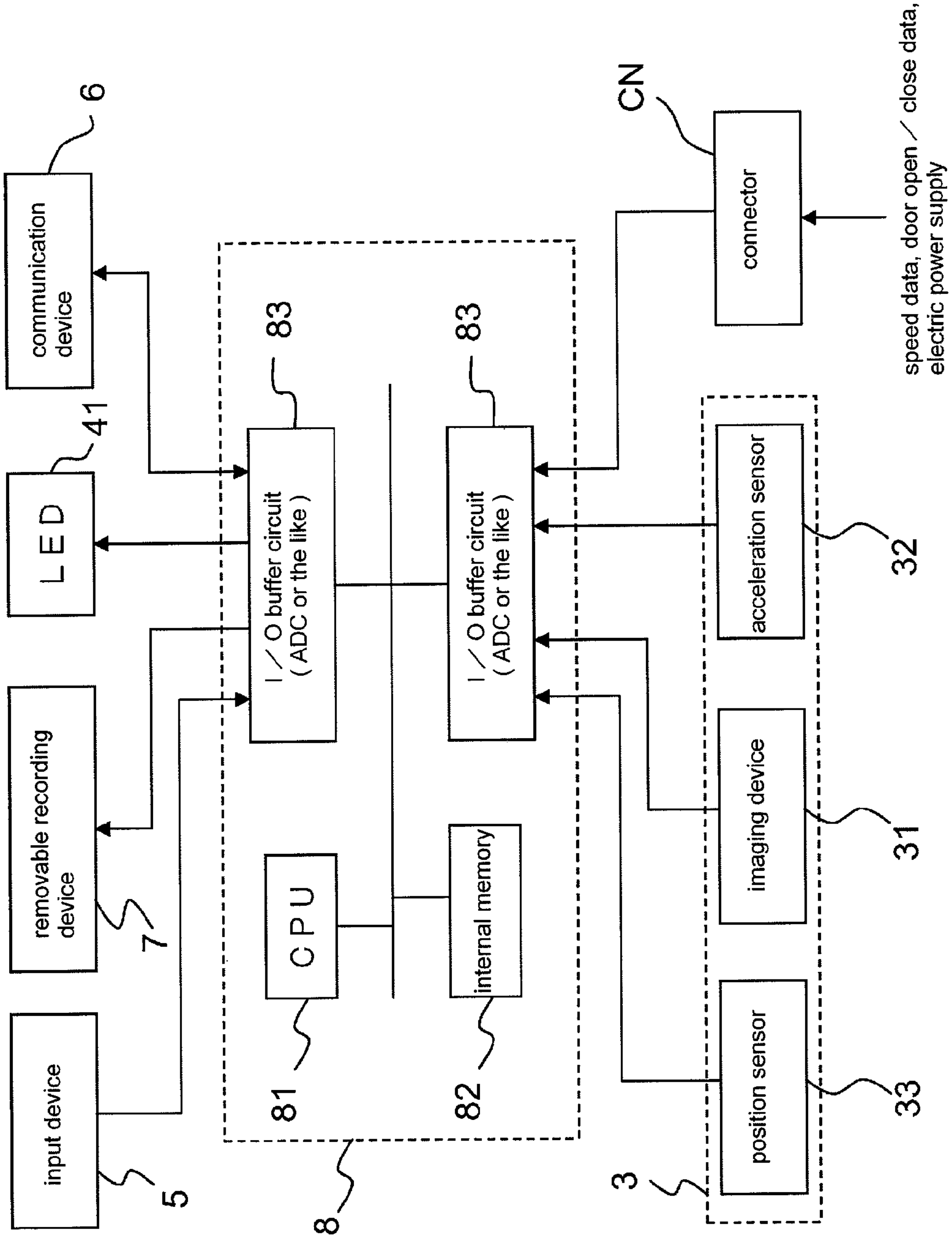
FIG. 7 is a functional block diagram of the driving recorder in accordance with this embodiment.

The detection device 3, as shown in FIG. 7, senses a situation regarding the behavior or the surrounding situation of the vehicle and outputs situation data indicating its situation. In this embodiment the detection device 3 comprises at least an imaging device 31, an acceleration sensor 32 and a position sensor 33. The imaging device 31 takes an image of a situation of outside the vehicle and outputs situation data indicating the image (the moving image data), and may be, for example, a CCD camera. The acceleration sensor 32 is of an arrangement that makes use of, for example, a Piezoresistance effect, and senses acceleration of one dimension to three dimensions (back and front, right and left, up and down, for example, in case of three dimensions) that applies to the vehicle and outputs the situation data (the acceleration data) indicating its acceleration. The position sensor 33 is, for example, a GPS receiver that catches electromagnetic waves from multiple satellites, senses a position of the vehicle V on which the driving recorder 1 is mounted and outputs the situation data (position data) indicating its position. The situation data comprises vehicle speed data transmitted from a vehicle speed sensor (not shown in drawings) of the vehicle V and door open/close data indicating an opening or closing of a door, and the data is received through a connector CN. The connector CN is also used for an electric power supply.

The alert device 4 comprises LEDs 41 as being an illuminant exposed to a surface of the casing 2 and a sound output body (not shown in drawings) such as a buzzer or a speaker built-in the casing 2.

The input device 5 is a button switch exposed to the surface of the casing 2.

The communication device 6 is hardware for wireless LAN that is built-in the casing 2 and that sends and receives electromagnetic waves to and from a base station.

In this embodiment, the detachable recording device 7 is a CF memory card that is mounted on a slot 2*b* opening toward a lateral side of the casing 2 with allowing demounting.

Figure 4:
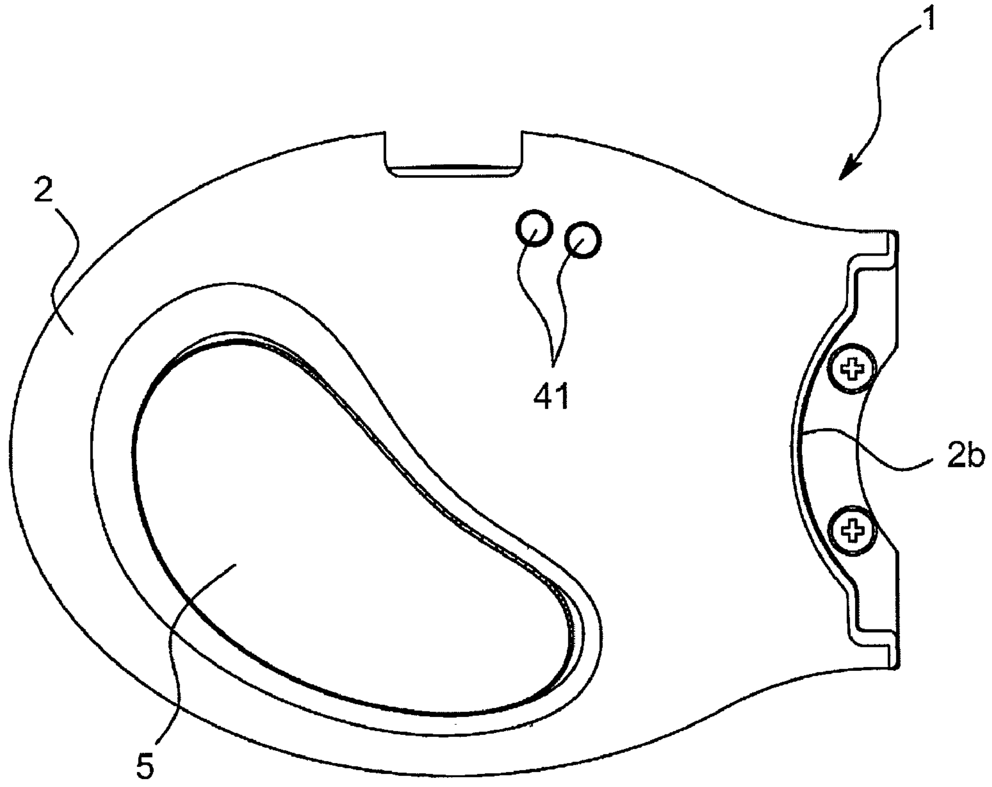
FIG. 4 is a front view of the driving recorder in accordance with this embodiment.
Figure 5:
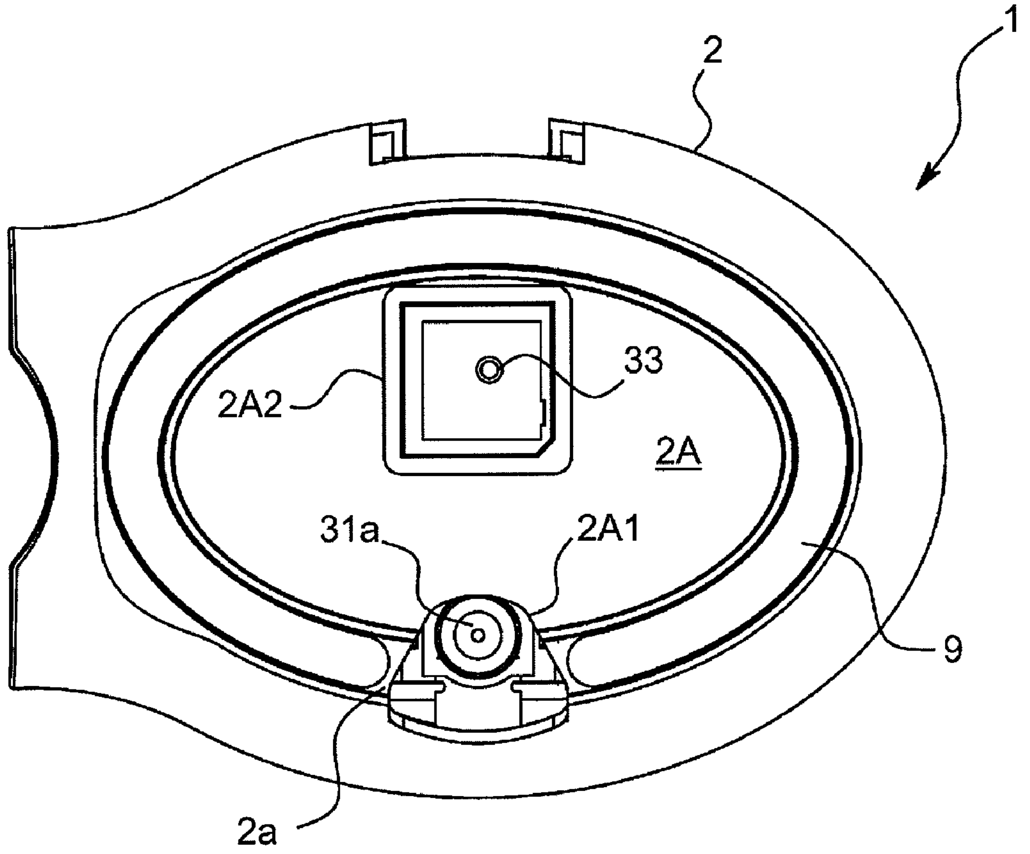
FIG. 5 is a back view of the driving recorder in accordance with this embodiment.
Figure 6:
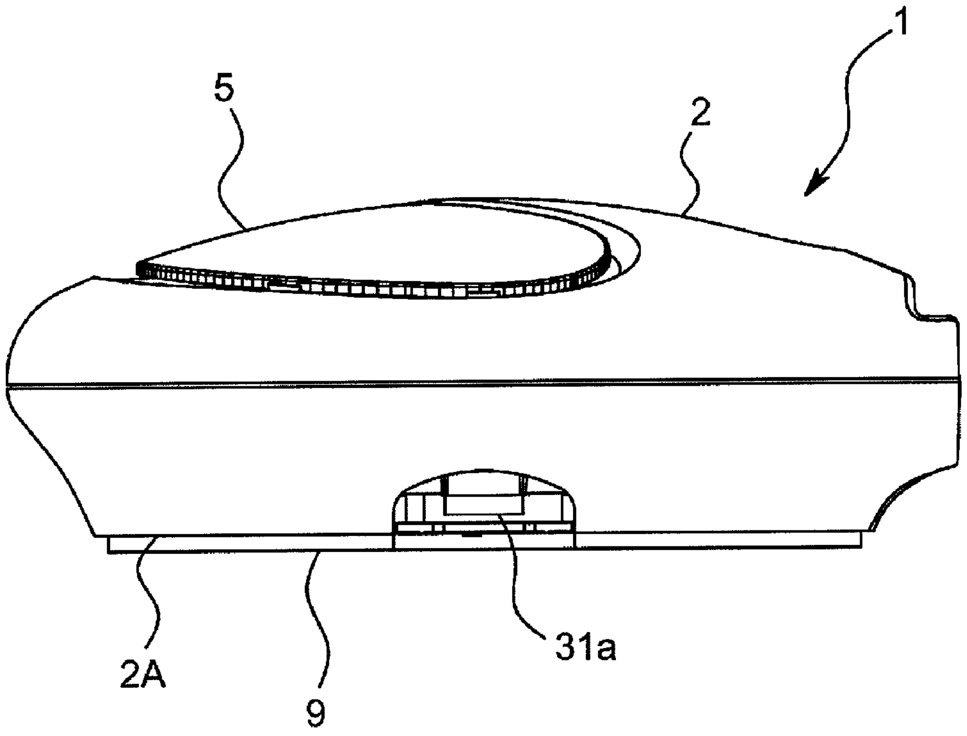
FIG. 6 is a side view of the driving recorder in accordance with this embodiment.

The information processing device 8 is, as shown in FIG. 4, structurally a so-called computer circuit that is built-in the casing 2 and that has a CPU 81, an internal memory 82 (for example, a nonvolatile memory) and an I/O buffer circuit 83 (there might be a case that an AD converter is included). Each device is controlled or information processed by operating the CPU 81 in accordance with programs stored in a predetermined area of the internal memory 82.

With briefly explained, the CPU 81 updates and temporarily stores the various situation data during driving, more specifically, the acceleration data, the position data and moving image data in a temporary area (hereinafter also called as a temporary data storage section) set in the memory 82 one after the other, and in case that an event indirectly indicating an occurrence of an accident, a hiyari-hatto or an abnormality occurs, the CPU 81 transfers and records the situation data during a certain period before and after the event in a regular area (hereinafter also called as a regular record data storage section) in the memory 82.

The event corresponds to a case wherein the acceleration (deceleration) indicated by the acceleration data exceeds a predetermined criterion value, a case wherein the period of the acceleration continues over a certain period, a case wherein the door is open or closed or a case wherein an electric power supply from a vehicle is halted. In this embodiment, depending on the event, only a case when some of the conditions occurs in combination such that the vehicle speed exceeds the upper limit, the acceleration or deceleration degree exceeds the predetermined criterion value or there is no brake, the data is recorded with making use of the case as a trigger so as to avoid recording useless data as much as possible.

In addition, a learning function is also provided in order to prevent recording useless data. More specifically, prior to recording the data, the driving recorder inevitably reports to the driver whether or not the event is a hiyari-hatto or an accident by means of the alert device 4 and receives an input showing a judgment whether right or wrong (for example, ON/OFF of the button switch 5) from the driver. With repeating this operation, a driving preference of a driver can be grasped to some extent, and the event specific to the driver and indirectly indicating the accident or the like is learned by changing, for example, a predetermined acceleration criterion value.

Furthermore, the recorded situation data is weighted based on a situation when the situation data is recorded and then classified in accordance with a level of the importance to be recorded. In case that the capacity of the memory runs out, it is so arranged that the situation data whose importance is lower than the importance of new situation data is automatically erased and the new situation data is recorded instead.

The situation data recorded officially is transmitted to an analysis center (not shown in drawings) wirelessly, or transferred to a detachable recording device 7 and the detachable recording device 7 is demounted and then carried in the analysis center so as to be used for after-the-fact analysis.

In this embodiment, as shown in FIG. 1 through FIG. 6, it is so arranged that the casing 2 is attached on a windshield W of the vehicle V with keeping a thermally connected state.

More specifically, almost all of the casing 2 is made of metal (a magnesium alloy) and a heat dissipation area 2*a* is arranged in a part of the casing 2. One surface of a heat conduction member 9 having adhesion properties and elasticity is pasted in the heat dissipation area 2*a* and the driving recorder 1 is attached to an arbitrary place of the windshield W through the heat conduction member 9.

The heat dissipation area 2*a* is set in an outer circumferential edge part of the flat surface part 2A which is of a generally elliptical shape formed by cutting a part of the egg-shaped form with a flat plane. The heat conduction member 9 of a generally flat elliptic annular shape having a predetermined width and a predetermined thickness is pasted generally along the heat dissipation area 2*a*. In this embodiment, the heat conduction member 9 is of a generally elliptic annular shape having a discontinuous part only at one portion, however it may have a little deformed part or some discontinuous parts at multiple portions as far as its shape is formed generally along the elliptic annular shape.

An opening portion 2A1 to expose a movable image receiving face 31*a* of the imaging device 31 and an opening portion 2A2 to expose an antenna 33a of the GPS receiver 33 are arranged on the flat surface part 2A.

In accordance with this embodiment, since the casing 2 can be thermally connected to the windshield W that is difficult to be high in temperature even though receiving direct sunlight, the heat can be dissipated through the windshield W by making use of the windshield W as the heat dissipation member, thereby preventing the driving recorder 1 from malfunction due to the high temperature.

In addition, since the automobile V vibrates, a problem is prone to happen that the driving recorder is detached from the automobile V in a mounted state that the driving recorder is pasted. However, in this embodiment the heat conduction member 9 is elastic and of the generally flat elliptic annular shape having the predetermined width and the predetermined thickness, the heat conduction member 9 suitably fits the curved windshield W so that it can be mounted on the windshield W securely. In addition, since the heat conduction member 9 fits like this, heat conduction is further improved.

Furthermore, since almost all of the casing 2 is made of the metal and the magnesium alloy, which is light, is used as the metal so that the casing 2 is weight saved as well as the heat dissipation efficiency is improved as much as possible, it is possible to mount the casing 2 on the windshield W more securely.

In addition, since the image receiving face 31*a* of the imaging device 31 and the antenna 33*a* of the GPS receiver 33 are arranged on the flat surface part 2A that faces the windshield W, nothing interrupts between the image receiving face 31*a*, the antenna 33*a* and the windshield W, it is possible to operate the driving recorder securely and smoothly. In addition, since the angle of the image receiving face 31*a* of the imaging device 31 can be adjusted to a necessary angle, it is possible to attach the recording device to an arbitrary place of the windshield W without obstructing a driver's field of vision.

The present claimed invention is not limited to the above-mentioned embodiment. For example, a shape of the casing is not limited to the egg-shaped form, and the heat conduction member may be of a generally toric shape. In addition, a surface of the casing may be in black so as to prevent reflection, or may be mirror finished so as to make it difficult to absorb heat.

The present claimed invention may be variously modified without departing from the spirit of the invention.

Possible Applications In Industry

In accordance with this invention, since the casing can be thermally connected to the windshield that is difficult to be high in temperature even though receiving the direct sunlight, the heat can be dissipated through the windshield by making use of the windshield as the heat dissipation member, thereby preventing the driving recorder from malfunction due to the high temperature.

The invention claimed is:

1. A driving recorder, wherein one or multiple detection devices that sense a situation concerning a behavior or a surrounding conditions of a vehicle and that output situation data indicating the situation, and a situation data storage section that stores the situation data output from the detection device are held in a single casing, and a heat dissipation area is formed on the casing and the heat conduction member that has a predetermined thermal conductivity and whose one surface is connected to a heat dissipation area is arranged and another surface of the heat conduction member can be bonded to a window glass of the vehicle.

2. The driving recorder described in claim 1, wherein the heat dissipation area is made of metal.

3. The driving recorder described in claim 1, wherein almost all of the casing is made of metal and the metal is magnesium alloy.

4. The driving recorder described in claim 1, wherein the heat dissipation area is of a generally elliptical annular shape or a toric shape having a predetermined width, and the heat conduction member having a predetermined thickness and elasticity is arranged along the heat dissipation area.

5. The driving recorder described in claim 4, wherein a whole shape of the driving recorder is of a generally egg-shaped form and an outer circumferential edge part of a generally elliptical flat surface part formed by cutting a part of the egg-shaped form with a flat plane is set as the heat dissipation area.

6. The driving recorder described in claim 5, wherein the detection device comprises at least an image receiving device, an acceleration sensor and a position sensor, and an image receiving surface of the image receiving device faces an opening of the generally elliptical flat surface part.

7. The driving recorder described in claim 2, wherein almost all of the casing is made of metal and the metal is magnesium alloy.

* * * * *